July 6, 1948.  A. J. LAMPERT  2,444,833
METHOD OF ASSEMBLING ZINC LINED CONTAINERS
Filed March 17, 1944  2 Sheets-Sheet 1
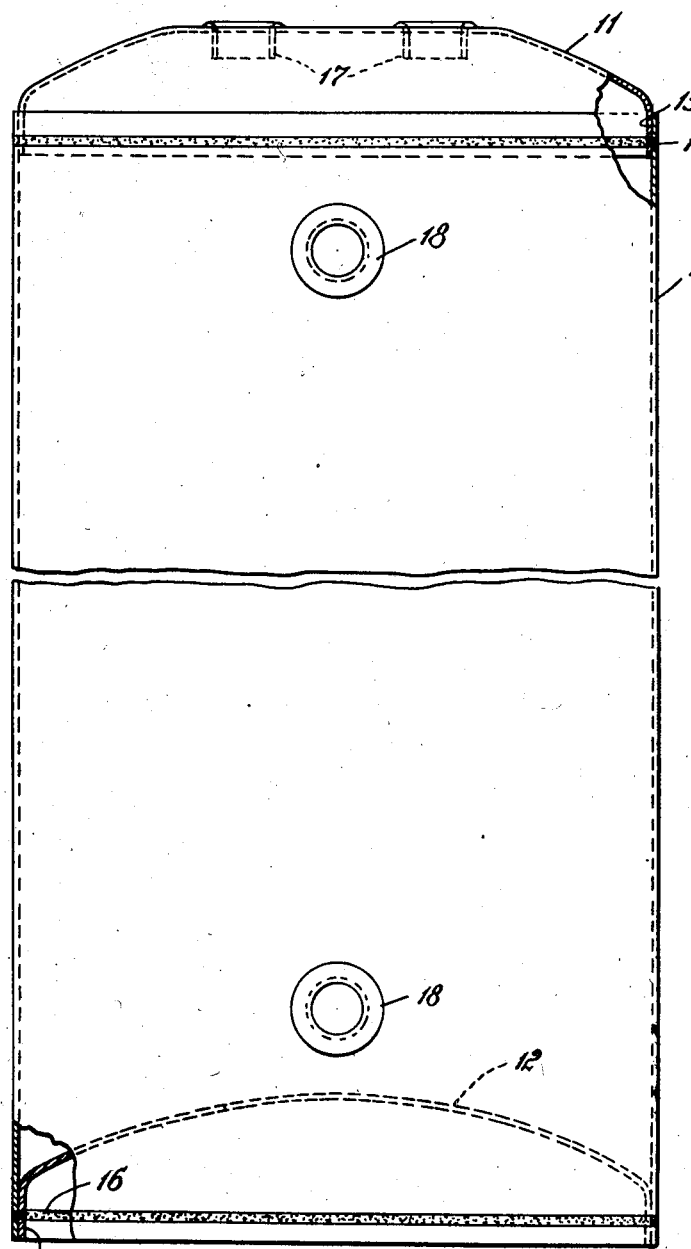
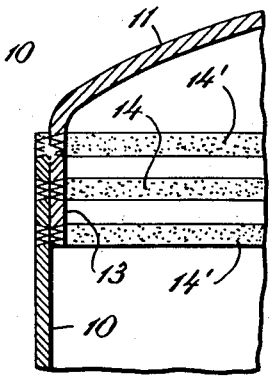
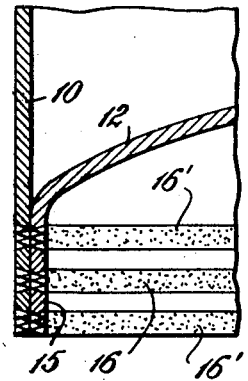
INVENTOR
ALBERT J. LAMPERT
BY
ATTORNEYS July 6, 1948. A. J. LAMPERT 2,444,833
METHOD OF ASSEMBLING ZINC LINED CONTAINERS
Filed March 17, 1944 2 Sheets-Sheet 2
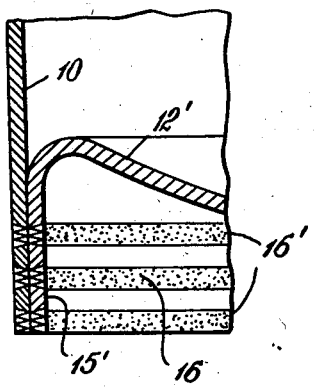
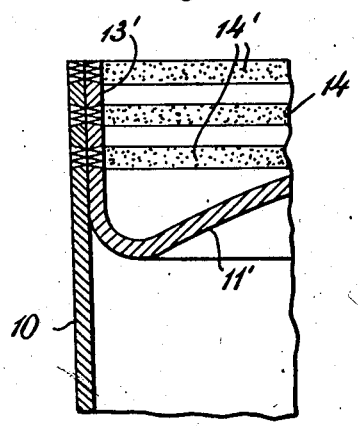
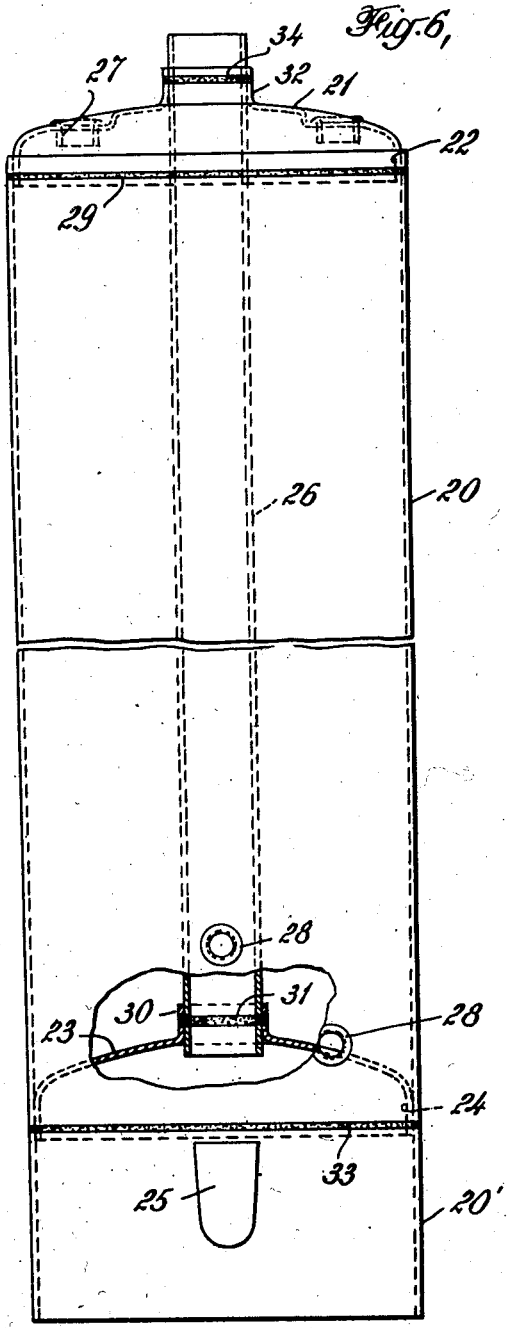
INVENTOR
ALBERT J. LAMPERT
BY
ATTORNEYS Patented July 6, 1948

2,444,833

UNITED STATES PATENT OFFICE 2,444,833

METHOD OF ASSEMBLING ZINC-LINED CONTAINERS

Albert J. Lampert, Sparrows Point, Md., assignor to Rheem Manufacturing Company, Richmond, Calif., a company of California Application March 17, 1944, Serial No. 526,891

3 Claims. (Cl. 29—162)

This invention relates to seam welded metal containers, such as range boilers, heater boilers, expansion tanks, and the like, and aims to provide certain improvements in the manufacture of such containers as well as an improved container construction.

Metal containers for holding water, and more especially hot water, are subject to more or less corrosive action by the water, depending to a large extent upon the nature of the water and the conditions under which the container is used. The inside surfaces of the container exposed to the water are customarily covered by a protective coating, such for example as zinc. Such hot water range and heater boilers made of steel are customarily coated inside with zinc usually by pouring or otherwise appropriately introducing molten zinc into the otherwise completed boiler. Due to the difficulty of inspecting the protective zinc coating on the inside of the boiler, it is the common practice to use more zinc for the coating than should be necessary in order to assure complete and adequate coating of the entire inside surfaces of the boiler. No commercially practical method has heretofore been devised for applying an electrodeposited coating of zinc to the inside of an otherwise completed boiler.

Metal containers, such as range and heater boilers, have heretofore been made with welded seams, usually by carbon electrode arc welding, rod welding, torch welding, or the like. Electric resistance seam welding has not heretofore been adopted in the manufacture of such containers since this type of welding requires that the parts to be welded be forced together with considerable pressure by the welding electrodes, and this is not practical in the heretofore customary types of container construction.

The present invention provides a container construction permitting commercially practical electric resistance seam welding of all joints, and further permits coating of all inside surfaces of the container before the final assembly is completed and hence under conditions permitting ready inspection and economy in the amount of protective coating required. In accordance with the invention, the end members are united to the hollow body member of the container by electric resistance seam welding carried out in such a sequence that the final weld, after the members are assembled in their completed form, is made with the exposed surfaces of the parts to be welded positioned outside the container and readily accessible for satisfactory electric resistance seam welding. To this end, the end members, such as the head and bottom of a range or heater boiler, have peripheral flanges capable of tightly fitting the respective opposite ends of the body member. One end member thus tightly fitting one end of the body member is united thereto by electric resistance seam welding, an operation that can be practiced without difficulty. The peripheral flange of the other end member is then tightly fitted to the other end of the body member with the exposed surfaces of the tight-fitting contact between the flange and the body member on the outside of the container and readily accessible for the final electric resistance seam welding. With one end member seam welded to the body member, the inside surfaces of these members can be readily covered with any suitable coating, such as a zinc coating formed by hot-dipping (galvanizing) or by electrodeposition. The other end member is similarly provided with the protective coating before it is fitted to the other end of the body member, so that after these members are seam welded all interior surfaces of the container have a protective coating of known quality. Where the protective coating is zinc, the welding operation melts the zinc on the contacting surfaces of the parts subjected to the final weld and the thus melted zinc forms an effective coating over the welded seam.

The foregoing and other novel features of the invention will be better understood from the following description taken in conjunction with the accompanying drawings, in which Fig. 1 is a front elevation, partly in section, of a range boiler of the invention, Figs. 2 and 3 are enlarged sectional detail views of the welded seams of the head and bottom, respectively, of the boiler of Fig. 1, showing three electric resistance seam welds instead of the one seam weld shown in Fig. 1, Figs. 4 and 5 are enlarged sectional detail views of modified forms of head and bottom, respectively, permitting convenient access for welding outside the container, and Fig. 6 is a front elevation, partly in section, of a heater boiler of the invention.

The container of the invention is made of weldable metal, that is any metal capable of being united by electric resistance seam welding, such as steel, steel alloys, ferrous base metals generally, and the like. Inasmuch as the heat required for and developed in resistance welding is due to the electrical resistivity of the parts to be welded, this method of welding is particularly applicable to metals of relatively high electrical resistivity like steel. The contacting surfaces of the parts to be welded should be comparatively clean and free from contaminating matter, particularly loosely adhering matter, such as grease, sand, dirt, rust, mill scale, and the like. To this end, it is customary to clean at least the contacting surfaces of the parts to be welded, as, for example by immersion in acid (pickling) followed by washing and drying, prior to the welding operation. Similarly, where a protective coating is to be applied to the inside surfaces of the container, such surfaces should be preliminarily cleaned and appropriately conditioned for the application of the coating.

Referring to Fig. 1 of the drawings, the range boiler comprises a hollow cylindrical body member or shell 10, a circular end member or head 11 and another circular end member or bottom 12. The head 11 has a peripheral flange 13 which, in the initial assembly of the boiler, is forced within one end of the body member, with a tight or forced fit. The flange 13 is then united to the body member by a circumferential electric resistance seam weld 14. In making this weld, one electrode or welding wheel bears directly against the outside surface of the body member and the opposite electrode or welding wheel is carried by an arm of sufficient length and rigidity to permit the electrode to be inserted through the open other end of the body member and to bear against the flange 13 with the necessary pressure required for satisfactory resistance welding. The oppositely positioned electrodes are moved circumferentially around the tightly-fitting flange and body member and thus form the resistance seam weld 14. A single seam weld usually suffices to make a liquid- and gas-tight joint between the flange and body member, but the single weld may, if desired, be strengthened or corrected (if imperfect) by one or more additional seam welds. Thus, Fig. 2 shows a central circumferential seam weld 14 and a strengthening seam weld 14' on each side thereof. In order to provide for such additional seam welds, the width of the tight-fitting contact between the flange 13 and the body member is at least twice and preferably three times the width of one circumferential seam weld.

Where the inside of the container is to be provided with a protective coating, such coating is applied to the inside surfaces of the body member 10 and head 11 after these members have been united by the circumferential seam weld. The surfaces to be coated are readily accessible for cleaning and conditioning, for the application of the coating, and for inspection of the applied coating. Thus, after appropriate conditioning, the inside surfaces of the united body member and head may be coated with zinc by electrodeposition or by hot dipped galvanizing, that is by immersion in a bath of molten zinc. The resulting zinc coating may be given a minute inspection for the detection of any imperfections. At the same time, the other end member or bottom 12 has a protective coating similarly applied to at least that face or surface which will be inside the container when it is united to the body member 10.

The bottom 12 had a peripheral flange 15 which is now forced within the other end of the body member 10 with a tight or forced fit. The exposed surfaces of the tight-fitting contact between the flange 15 and the body member are entirely outside the container and thus conveniently accessible for electric resistance seam welding. The oppositely positioned electrodes press the flange 15 and contacting body member together and move circumferentially around these contacting parts intermediate the inner and outer edges of the flange to form the circumferential seam weld 16. In Fig. 3, the bottom 12 is shown united to the body member 10 by a central circumferential seam weld 16 and a strengthening seam weld 16' on each side thereof. The width of the tight-fitting contact between the flange 15 and the body member 10 is twice and preferably three times as wide as one circumferential seam weld to accommodate the strengthening or correcting welds 16' if desired or needed.

The electric resistance seam welding of the head 11 to the body member 10 is carried out under the optimum conditions with respect to the surfaces of contact of the parts to be welded. Thus, these surfaces will have been freshly cleaned and conditioned for resistance welding and are separated by no coating or film of any protective covering. The requisite pressure between the oppositely positioned electrodes for resistance welding may thus be practically attained in spite of the length of the extended arm of the electrode within the hollow body member. On the other hand, a greater electrode pressure is required for resistance welding when the surfaces of the parts to be welded are separated by a coating or film of any protective covering, but in accordance with the invention this greater pressure is readily attained because the final weld is made under ideal conditions, with the exposed surfaces of the parts to be welded positioned outside the container and readily accessible to be clamped between the electrodes. In welding surfaces coated with zinc, it has been found advantageous to use a colloid graphite mixture on the welding wheels. At the welding temperature, a zinc coating between the parts being welded melts and forms a seal of zinc on both sides of the seam weld which effectively prevents any corrosive action within the container in the vicinity of the seam.

The range boiler shown in Fig. 1 has two spuds or couplings 17 in the head, and two spuds or couplings 18 in the body member for making the necessary water connections to the boiler. These spuds are pressed or forced into appropriate holes cut in the head and body member before the members are united by the seam weld 14 or after being so united, but in any event before the zinc or other protective coating is applied. Thus, the inside surfaces of the spuds are coated with zinc or other protective material when the united head and body member are so coated, thereby assuring the same advantages in coating hereinbefore mentioned in connection with the head and body member.

A particular advantage of the invention is that it permits the application inside the container of a protective metal coating, such as zinc, by electrodeposition. Containers of this type as heretofore constructed cannot be precoated before assembly with any assurance that the coating will not be impaired during assembly. Hence, it is now customary to apply the protective coating to the inside of the container after it has been assembled and united. Using molten zinc, an excess of zinc is required to assure an adequate coating, and any inspection of the coating is at best superficial. By the practice of the invention, a saving of approximately 30% of the zinc is effected when coating with molten metal, compared to the heretofore customary practice. Electrodeposited zinc is a better protective coating than can be produced by galvanizing, and practice of the invention permits application of the coating by electrodeposition, whereas in the heretofore customary practice electrodeposition of the protective coating is not feasible.

The electric resistance seam weld is a more satisfactory type of weld than the carbon arc weld or rod weld heretofore used. With similar gauge metal, the resistance seam weld is stronger and tighter, and is capable of withstanding considerably higher internal pressures than the heretofore customary types of weld. The resistance seam weld is moreover uniform and neat in appearance, and is readily and conveniently made without the variations, irregularities and imperfections that frequently occur in the heretofore customary welding practices due to unskillful or careless operative manipulation.

The bottom 12 of Figs. 1 and 3 is of the conventional dish type with its convex face inside the boiler. A reversed dish bottom with its concave face inside the boiler and having a peripheral flange 15' is shown in Fig. 4. When tightly-fitted in the bottom of the body member 10, the parts to be welded are outside the container and ideally accessible for making the resistance seam welds 16 and 16'.

Fig. 5 shows the dish or concave head 11 of Fig. 1 replaced by a reversed dish head 11' with its concave face inside the boiler and having a peripheral flange 13'. The head 11' is united to the body member or shell 10 by the resistance seam welds 14 and 14'. Any combination of end members may be used in the boiler or other container, provided the parts to be finally welded are positioned outside the container and readily accessible for resistance seam welding as illustrated in Figs. 3, 4 and 5.

While it is my preferred practice to fit the flange of the end members within the body member, particularly when this member is cylindrical, the flange of the end member may be tightly fitted over the body member. The body member is less easily outwardly strained than is the flange of the end member, and a stronger and more perfect forced fit can therefore be obtained with the flange inside the body member.

The heater boiler shown in Fig. 6 comprises a cylindrical body member or shell 20, a head 21 having a peripheral flange 22, and a bottom 23 having a peripheral flange 24. The bottom 23 is inwardly spaced from the lower end of the body member to accommodate a heating unit (not shown) in the space beneath the bottom and the enclosing skirt 20' of the body member. This skirt 20' has an opening 25 for access to the heating unit. A pipe or flue 26 extends through the boiler from the bottom 23 to the head 21 for conveying through the boiler the hot products of combustion or heating gases from the heating unit positioned beneath the open lower end of the pipe 26. The head and body member have pressed in spuds 27 and 28, respectively.

In making the heater boiler of Fig. 6, the flange 22 of the head 21 is tightly fitted within the body member 20 and united therewith by one or more electric resistance seam welds 29. The spuds 27 and 28 are forced into position either before or after the head and body member have been seam welded. The lower end of the pipe 26 is tightly fitted within a turned or struck up flange 30 of the bottom 23 and united therewith by one or more electric resistance seam welds 31. The members so united are then provided with any contemplated protective coating, such for example as a coating of electrodeposited zinc, as hereinbefore described. Coating the exterior surface of the pipe 26 protects it against the corrosive action of the hot water in the boiler, while coating the inside surface of the pipe is desirable for protecting it against the corrosive action of the heating gases flowing therethrough. The bottom is next forced through the skirt 20' to its contemplated position within the lower end of the body member 20, and at the same time the upper end of the pipe 26 is forced through a turned or struck up flange 32 of the head 21. The flange 24 of the bottom 23 is then united to the body member 20 by one or more electric resistance seam welds 33, and finally the upper end of the pipe 26 is united to the flange 32 of the head 21 by one or more electric resistance seam welds 34.

While I have herein particularly described the invention as applied to range and heater boilers, it is to be understood that the invention is equally applicable to any closed container made of weldable metal, and particularly containers for holding water and other liquids. The resistance seam welds are strong, liquid and gas tight, and capable of withstanding hydrostatic and other internal pressures considerable in excess of any pressure encountered in the normal use of the container. The protective coating on the inside of the container, and in particular electrodeposited zinc, is economically and effectively applied with ample opportunity for the detection of imperfections. Where the zinc coating, either electrodeposited or hot-dipped galvanized, serves as a base for a second corrosion-resistant coating more readily applied to zinc than the weldable metal, such for example as coatings of chromium oxide and the like or electrodeposited coatings of chromium, nickel, etc., the second coating may be applied to the zinc coating before finally assembling the completed container as hereinbefore described.

I claim:

1. The method of making a container of weldable metal which comprises uniting to the body member of the container an end member having a peripheral flange tightly fitting one end of the body member, applying a protective zinc coating to the interior of the body member and said end member, tightly fitting the peripheral flange of another flanged end member, the interior surface of which has a protective zinc coating, into the other end of the body member with the exposed surfaces of the tightly fitting contact between the flange and the body members on the outside of the container, and simultaneously uniting the flange of said other end member to the body member by electric resistance seam welding through the protective zinc coating in the tight-fitting contact between the flange of that end member and the body member and melting the zinc coating in said tight-fitting contact adjacent said weld, whereby on resolidification of such melted zinc a zinc bond and seal will be formed between the body member and the flange of said other end member which will further assure a leakproof joint being formed.

2. The method of making a container of weldable metal as set forth in claim 1 in which the resistance seam weld is formed intermediate the inner and outer edges of the flange of said end member so that a zinc bond and seal is formed between the body portion and the flange of said other end member at each side of said weld.

3. The method of making an internally zinc-coated container which comprises uniting a head having a peripheral flange making a tight fit with one end of a hollow body member to said body member by welding said flange to one end portion of the body member, coating with zinc the interior of the body member and head united as aforesaid, welding one end of a pipe of greater length than the effective length of the body member to a circular flange struck up from a base with which flange the pipe makes a tight fit, coating with zinc the exterior surface of the pipe and adjacent surface of the base, assembling the thus united sub-assemblies with the other end of the pipe tightly fitting within a circular flange struck up from the head and with a peripheral flange of the base tightly fitting the lower end portion of the body member, simultaneously uniting the flange of the base to the contacting body member by electric resistance seam welding through the protective zinc coating between the flange and the body member and melting the zinc coating in said tight-fitting contact adjacent said weld, whereby on resolidification of such melted zinc a zinc bond and seal will be formed between the lower end portion of the body member and the flange of said base which will further assure a leak-proof joint being formed, and welding the struck-up circular flange of the head to the contacting pipe.

ALBERT J. LAMPERT.

REFERENCES CITED

The following references are of record in the file of this patent:

UNITED STATES PATENTS

| Number | Name | Date |
| --- | --- | --- |
| 1,414,822 | Ledwinka | May 2, 1922 |
| 1,556,651 | Walker | Oct. 31, 1925 |
| 2,210,277 | Bullock | Aug. 6, 1940 |
| 2,229,526 | Schabacker | Jan. 21, 1941 |
| 2,263,021 | Uecker | Nov. 18, 1941 |
| 2,322,488 | Uecker | June 22, 1943 |
| 2,330,940 | Wright | Oct. 5, 1943 |
| 2,363,990 | Priebe | Nov. 28, 1944 |

OTHER REFERENCES

"Welding Handbook," 1942 edition; published by American Welding Society, New York, New York. Pages 353 and 363. Copy in Division 14.